United States Patent [19]
Ramanathan et al.

[11] Patent Number: 6,123,988
[45] Date of Patent: Sep. 26, 2000

[54] PROCESS FOR THE PREPARATION OF POLYURETHANE SPHERICAL PARTICLE

[75] Inventors: Lalgudi Srinivasan Ramanathan; Swaminathan Sivaram, both of Pune, India

[73] Assignee: Council of Scientific & Industrial Research, New Delhi, India

[21] Appl. No.: 09/143,240

[22] Filed: Aug. 28, 1998

[30] Foreign Application Priority Data

Jun. 12, 1998 [IN] India ................................. 1634/Del/98

[51] Int. Cl.$^7$ .............................. B01J 13/02; B05D 7/00; B32B 15/02
[52] U.S. Cl. .................... 427/213.3; 427/213.31; 427/213.34; 427/213.36; 428/402.21; 264/4.1; 264/4.33; 264/4.7
[58] Field of Search ........................... 427/213.3, 213.31, 427/213.34, 213.36; 428/402.21; 264/4.1, 4.33, 4.7

[56] References Cited

U.S. PATENT DOCUMENTS 5,911,923   6/1999   Work et al. .............................. 264/4.7

*Primary Examiner*—Nathan M. Nutter
*Attorney, Agent, or Firm*—Michael D. Bednarek; Crowell & Moring LLP

[57] ABSTRACT

This invention relates to the process for the preparation of polyurethane with controlled particle size and shape. More, particularly it relates to the production of polyurethane microspheres from a diol and diisocyanate by dispersion polymerization in presence of a steric stabilizer and a catalyst in an organic solvent at a controlled temperature, and finally separating the spherical polyurethane particles from the reaction mixture by conventional means.

12 Claims, 1 Drawing Sheet

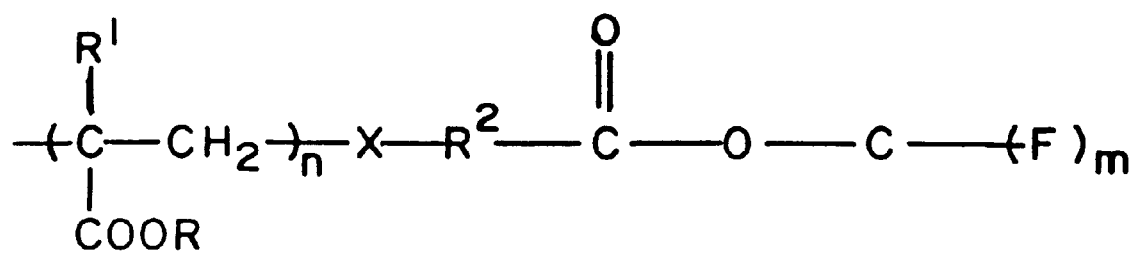
FORMULA-I

PROCESS FOR THE PREPARATION OF POLYURETHANE SPHERICAL PARTICLE

FIELD OF INVENTION

The present invention relates to a process for the preparation of polyurethane in powder form with controlled particle size and shape. More particularly it relates to the production of polyurethane microspheres from a diol and diisocyanate by dispersion polymerization in presence of a steric stabilizer particularly a polycondensable macromonomer having formula (I) in the drawing accompanying the specification.

Polyurethane particulates obtained by this invention are suitable for a wide variety of useful applications such as coatings, adhesives and also an encapsulant material for pigments, agrochemicals, drugs and reactive chemicals like curing agents.

BACKGROUND OF INVENTION

In prior art, polyurethane powders are prepared by cryogenic grinding or extrusion and granulation of thermoplastic polyurethanes. (U.S. Pat. No. 3,214,411; JP-02-124978). JP 03-181526 discloses a process for producing polyurethane microparticles by dissolving polyurethane resin in amino alcohol at 130 to 150° C. followed by cooling, filtering and drying under vacuum. In another method (JP 04-248875), hydroxyl and/or amino group containing resin is reacted with blocked isocyanates in a suitable solvent at elevated temperature. The solvent is removed under reduced pressure. The polyurethane powder obtained is filtered and dried. These techniques however, do not yield polyurethane powder in controlled particle size and shape.

Spherical polyurethane particles are prepared by suspension polymerization of an isocyanate terminated prepolymer in aqueous or non-aqueous medium. U.S. Pat. No. 4,083,831 describes oil in water suspension polycondensation technique wherein an isocyanate terminated prepolymer is suspended in aqueous media. The reaction proceeds in aqueous medium and produces polyurethane urea powder which is stabilized by a combination of anionic and homopolymeric stabilizers. In an another variant, polyurethane spherical particles are obtained by suspension polycondensation in non-aqueous media (U.S. Pat. No. 4,032,516). In this art, the isocyanate terminated prepolymer is suspended in paraffin oil using sodium dodecylsulfosuccinate as a stabilizer. The chain extension was carried out with 1,4-butane diol in n-heptane and in the presence of an amphiphilic block copolymer namely 1-hexadecane vinylpyrrolidone as steric stabilizer.

Stabilization of polyurethane spherical particles in aqueous and non-aqueous medium is known in the prior art. For instance, JP 04-225755; JP 03-31359 and JP 04-202311 describes the use of a stabilizer derived from polycaprolactone, polybutadiene and isophrone diisocyanate to prepare polyurethane powder in n-heptane. In yet another application JP 02-38453 discloses the preparation of stabilizers derived from poly (butylene adipate), maleic anhydride and lauryl methacrylate. In addition to these block copolymers, protective colloids such as polyvinyl alcohol, methylcellulose, gelatin, sodium alkyl sulfate are also employed to stabilize polyurethane microspheres (JP 04-161416).

Polyurethane spherical particles obtained by this prior art are polydisperse and their size ranging between 1 and 1000μ even at higher stabilizer concentrations. Furthermore, none of the application uses diol and diisocyanate directly. Instead, an isocyanate terminated prepolymer is used to produce polyurethane microspheres.

OBJECTS OF THE INVENTION

The object of the present invention is to provide for preparing polyurethane microspheres with controlled particle size from a diol and a diisocyanate.

Another object of this invention is to stabilize polyurethane particles using a polycondensable macromonomer, particularly a macrodiol, which is enchained in the polymer backbone and stabilizes the polyurethane particles.

Yet another object of the present invention is to produce polyurethane particles of size ranging from 100 nm to 1000μ by varying the concentration of the stabilizer.

BRIEF DESCRIPTION OF THE DRAWINGS

The drawings depict a chemical formula of a polycondensable macromonomer, particularly a macrodiol, that contains a long chain of hydrophobic moiety with reactive hydroxyl groups at the chain terminal.

DETAILED DESCRIPTION OF THE INVENTION

Accordingly, the present invention provides a process for producing polyurethane microspheres with controlled particle size which comprises reacting a diol and an organic diisocyanate and optionally a multifunctional hydroxyl compound in presence of a polycondensable macromonomer and a catalyst in an organic solvent at temperatures ranging from 40 to 100° C. for a period ranging between 2 and 12 hours, separating the spherical polyurethane particles from the reaction mixture by conventional means.

In an embodiment of the present invention the diols used are isocyanate reactive which are exemplified by ethylene glycol, 1,2-polyyleneglycol, 1,3-polypleneglycol, diethylene glycol, 1,4-butane diol, 1,3-butane diol, 1,6-hexane diol, 2-ethyl-1,3-hexane diol, 1,8-octane diol, neopentyl glycol, 2-methyl-1,3- propane diol and 1,4-cyclohexane dimethanol trimethylol propane, ditrimethylol propane, 1,2,6-hexane triol (its isomers), pentaerythrytol, di and tripentaerythrytol, sorbitol and glycerine and polyols such as polyether diol, polyester diol, polycaprolactone diol, hydroxyl terminated polybutadiene with 2 or more hydroxyl group and hydroxyl number ranging between 50 and 100 mg KOH/gm and acid number preferably less than 2 mg. KOH/gm with number average molecular weights ranging from 200 to 3000.

In another embodiment the diisocyanates used may be selected from 2,2,4-trimethyl hexamethylene diisocyanate, 1,4-tetramethylene diisocyanate, 1,6-hexamethylene diisocyanate (HDI), isophorone diisocyanate (IPDI), 4,4'-methylene-bis- (cyclohexane diisocyanate), meta or para-tetramethyl xylene diisocyanate, α, α'-xylylene diisocyanate, toluene diisocyanate, 1,4 phenylene diisocyanate, 4,4'-diphenyl methane diisocyanate, meta or para- tetramethyl xylene diisocyanate and higher polyfunctional isocyanates like 2,4,6-triisocyanato toluene, 4,4',4"-triisocyanate triphenyl methane, 1,2,4- benzene triisocyanate, biurets of diisocyanates, trimer of HDI, IPDI and TMR adducts of TDI,IPDI,HDI,MDI,TMXDI and the like. (TMP=3D Trimethylol propane; (TMxDI=3D Tetramethyl xylene diisocyanate; TDI=Tolune diisocyanate)

In yet another embodiment of the present invention, the polycondensable macromonomer, particularly a macrodiol, contains a long chain hydrophobic moiety with reactive hydroxyl groups at the chain terminal, as mentioned in formula (I) in the drawing accompanying the specification, wherein R=an alkyl group with 1–40 carbon atoms
$R^1$=hydrogen or methyl
$R^2$=alkylene units
X=bifunctional moiety
F=functional group
n=3–45
m=$\geq$2

In still another embodiment the catalyst used enhances the isocyanate-hydroxyl reaction and may be selected from triethylene diamine, morpholine, N-ethylmorpholine, piperazine, triethanolamine, triethylamine, dibutyltindilaurate, stannous octoate, dioctyl tin di acetate, lead octoate, stannous tallate and dibutyltindioxide.

In another embodiment of the present invention, the organic solvent used may be are isocyanate non reactive and good solvent for the monomers and non-solvent for the polymer particles, which are exemplified by aliphatic hydrocarbons such as hexane, heptane, octane, decane, isooctane, dodecane, hexadecane, superior kerosene, paraffin oil, white mineral oil, and aromatic hydrocarbons such as benzene, toluene, xylene and the like or a suitable mixture of aliphatic and aromatic hydrocarbons.

In a feature of the present invention, the ratio of isocyanate to diol is maintained between 1 and 2, more preferably in the range from 1.05 to 1.5. The amount of macrodiol varies from 1 to 25 percent, preferably from 3 to 18 percent based on the total quantity of urethane forming reactants. The amount of catalyst is in the range from 0.005 to 1 weight percent based on the total amount of diol and diisocyanate. The ratio of monomer to organic continuous phase is between 5 and 50 and preferably in the range from 10 to 30. The polymerization can be carried out in any conventional resin reactor equipped with a cooling jacket, a double walled condenser, a thermowell, an inlet tube for nitrogen gas purging and an addition funnel for monomer feeding. Stirring can be done by using any conventional stirring device. The agitator speed may be in between 200 and 800 revolutions per minute (rpm). The polymerization reaction can be carried out between 40° C. and 100° C. and more preferably between 60° C. and 90° C. The reaction time is typically between 3 and 10 hours. The conversion of isocyanate is in the range between 82 and 100 percent. The polyurethane microspheres formed at the end of the reaction is washed thoroughly with a low boiling aliphatic hydrocarbon particularly hexane and dried at room temperature under vacuum. The particle size of the polyurethane microsphere ranges from 150 nm to 500$\mu$ depending on the concentration of the macrodiol stabilizer.

The process of the present invention is described by the following examples which are illustrative only and should not be construed to limit the scope of the application in any manner.

Example 1

In a four neck 250 mL round bottom flask fitted with a stirrer, condenser, nitrogen inlet and a thermowell, 0.38 g macrodiol (derived from polylauryl methacrylate of molecular weight 2000), 0.5 g of 1% dibutyl tin dilaurate in paraffin oil and 25 g paraffin oil were added and stirred at 500 rpm. The mixture was then heated to 65° C. and 3 g 2-ethyl-1, 3-hexane diol and 4.6 g toluene diisocyanate were added. The reaction was continued for 5 h. The polyurethane microspheres formed was washed with hexane to remove paraffin oil and it is dried under vacuum at room temperature for about 4 h to obtain a free flowing polyurethane powder.

Example 2

In a four neck 250 mL round bottom flask fitted with a stirrer, condenser, nitrogen inlet and a thermowell, 0.76 g macrodiol (derived from polylauryl methacrylate of molecular weight 2000), 0.5 g of 1% dibutyl tin dilaurate in paraffin oil and 25 g paraffin oil were added and stirred at 500 rpm. The mixture was then heated to 65° C. and 3 g 2-ethyl-1, 3-hexane diol and 4.6 g toluene diisocyanate were added. The reaction was continued for 5 h. The polyurethane microspheres formed was washed with hexane to remove paraffin oil and it is dried under vacuum at room temperature for about 4 h to obtain a free flowing polyurethane powder.

Example 3

In a four neck 250 mL round bottom flask fitted with a stirrer, condenser, nitrogen inlet and a thermowell, 1.14 g macrodiol (derived from polylauryl methacrylate of molecular weight 2000), 0.5 g of 1% dibutyl tin dilaurate in paraffin oil and 25 g paraffin oil were added and stirred at 500 rpm. The mixture was then heated to 65° C. and 3 g 2-ethyl-1, 3-hexane diol and 4.6 g toluene diisocyanate were added. The reaction was continued for 5 h. The polyurethane microspheres formed was washed with hexane to remove paraffin oil and it is dried under vacuum at room temperature for about 4 h to obtain a free flowing polyurethane powder with average particle size 1.2 microns Example 4

In a four neck 250 mL round bottom flask fitted with a stirrer, condenser, nitrogen inlet and a thermowell, 0.38 g macrodiol (derived from polylauryl methacrylate of molecular weight 5000), 0.5 g of 1% dibutyl tin dilaurate in paraffin oil and 25 g paraffin oil were added and stirred at 500 rpm. The mixture was then heated to 65° C. and 3 g 2-ethyl-1, 3-hexane diol and 4.6 g toluene diisocyanate were added. The reaction was continued for 5 h. The polyurethane microspheres formed was washed with hexane to remove paraffin oil and it is dried under vacuum at room temperature for about 4 h to obtain a free flowing polyurethane powder.

Example 5

In a four neck 250 mL round bottom flask fitted with a stirrer, condenser, nitrogen inlet and a thermowell, 0.76 g macrodiol (derived from polylauryl methacrylate of molecular weight 2000), 0.5 g of 1% dibutyl tin dilaurate in paraffin oil and 25 g paraffin oil were added and stirred at 500 rpm. The mixture was then heated to 65° C. and 3 g 2-ethyl-1, 3-hexane diol and 4.6 g toluene diisocyanate were added. The reaction was continued for 5 h. The polyurethane microspheres formed was washed with hexane to remove paraffin oil and it is dried under vacuum at room temperature for about 4 h to obtain a free flowing polyurethane powder with average particle size 220 nm.

Example 6

In a four neck 250 mL round bottom flask fitted with a stirrer, condenser, nitrogen inlet and a thermowell, 1.14 g macrodiol (derived from polylauryl methacrylate of molecular weight 5000), 0.5 g of 1% dibutyl tin dilaurate in paraffin oil and 25 g paraffin oil were added and stirred at 500 rpm. The mixture was then heated to 65° C. and 3 g 2-ethyl-1, 3-hexane diol and 4.6 g toluene diisocyanate were added. The reaction was continued for 5 h. The polyurethane microspheres formed was washed with hexane to remove paraffin oil and it is dried under vacuum at room temperature for about 4 h to obtain a free flowing polyurethane powder with average particle size 180 nm.

Example 7

In a four neck 250 mL round bottom flask fitted with a stirrer, condenser, nitrogen inlet and a thermowell, 0.25 g macrodiol (derived from polylauryl methacrylate of molecular weight 2000), 0.38 g of 1% dibutyl tin dilaurate in paraffin oil and 25 g paraffin oil were added and stirred at 500 rpm. The mixture was then heated to 65° C. and 1.5 g polyester diol (number average molecular weight 750) and 0.45 g toluene diisocyanate were added. The reaction was continued for 5 h. The polyurethane microspheres formed was washed with hexane to remove paraffin oil and it is dried under vacuum at room temperature for about 4 h to obtain a free flowing polyurethane powder.

Example 8 (comparative example)

In a four neck 250 mL round bottom flask fitted with a stirrer, condenser, nitrogen inlet and a thermowell, 0.5 g of 1% dibutyl tin dilaurate in paraffin oil and 25 g paraffin oil were added and stirred at 500 rpm. The mixture was then heated to 65° C. and 3 g 2-ethyl-1,3-hexane diol and 4.6 g toluene diisocyanate were added. After a period of 10 minutes the reaction mixture was gelled and large lumps were separated out from the paraffin oil medium.

Example 9 (comparative example)

In a four neck 250 mL round bottom flask fitted with a stirrer, condenser, nitrogen inlet and a thermowell, 1.14 g carboxyl terminated polylauryl methacrylate of molecular weight 5000, 0.5 g of 1% dibutyl tin dilaurate in paraffin oil and 25 g paraffin oil were added and stirred at 500 rpm. The mixture was then heated to 65° C. and 3 g 2-ethyl-1,3-hexane diol and 4.6 g toluene diisocyanate were added. After a period of 10 minutes the reaction mixture was gelled and large lumps were separated out from the paraffin oil medium.

The two comparative examples suggest that polyurethane in powder form cannot be prepared without the use of the stabilizer described herein.

What is claimed is:

1. A process for producing polyurethane microspheres with controlled particle size which comprises reacting a diol and an organic diisocyanate and optionally a multifunctional hydroxyl compound in the presence of a polycondensable macromonomer, having a long chain hydrophobic moiety and reactive hydroxyl groups at a chain terminal, and a catalyst in an organic solvent at temperatures ranging from 40 to 100° C. for a period ranging between 2 and 12 hours, separating the spherical polyurethane particles from the reaction mixture by a resin reactor.

2. The process as claimed in claim 1 wherein, the diols may be isocyanate reactive which are exemplified by ethylene glycol, 1,2-propyleneglycol, 1,3-propyleneglycol, diethylene glycol, 1,4-butane diol, 1,3-butane diol, 1,6-hexane diol, 2-ethyl-1,3-hexane diol, 1,8-octane diol, neopentyl glycol, 2-methyl-1,3- propane diol and 1,4-cyclohexane dimethanol trimethylol propane, ditrimethylol propane, 1,2,6-hexane triol (its isomers), pentaerythrytol, di and tripentaerythrytol, sorbitol and glycerine and polyols such as polyether diol, polyester diol, polycaprolactone diol, hydroxyl terminated polybutadiene with 2 or more hydroxyl group and hydroxyl number ranging between 50 and 100 mg. KOH/gm and acid number less than 2 mg. KOH/gm with number average molecular weights ranging from 200 to 3000.

3. The process as claimed in claim 1 wherein the diisocyanates are selected from the group consisting essentially of 2,2,4-trimethyl hexamethylene diisocyanate, 1,4-tetramethylene diisocyanate, 1,6-hexamethylene diisocyanate (HDI), isophorone diisocyanate (IPDI), 4,4'-methylene-bis-(cyclohexane diisocyanate), meta or para-tetramethyl xylene diisocy-anate, α, α'-xylylene diisocyanate, toluene diisocyanate, 1,4 phenylene diisocyanate, 4,4'-diphenyl methane diisocyanate, meta or para-tetramethyl xylene diisocyanate and higher polyfunctional isocyanates like 2,4, 6-triisocyanato toluene, 4,4',4"-triisocyanate triphenyl methane, 1,2,4- benzene triisocyanate, biurets of diisocyanates, trimer of HDI, IPDI and TMP adducts of TDI,IPDI, HDI, MDI, and TMXDI.

4. The process as claimed in claim 1 wherein, the polycondensable macromonomer, particularly a macrodiol, comprises a formula

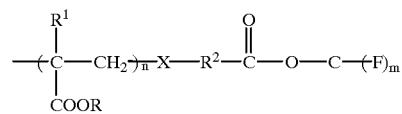

wherein
R=an alkyl group with 1–40 carbon atoms
$R^1$=hydrogen or methyl
$R^2$=alkylene units
X=bifunctional moiety
F=functional group
n=3–45
m=0.2

5. The process as claimed in claim 1 wherein, the catalysts are selected from the group consisting essentially of triethylene diamine, morpholine, N-ethylmorpholine, piperazine, triethanolamine, triethylamine, dibutyltindilaurate, stannous octoate, dioctyl tin di acetate, lead octoate, stannous tallate and dibutyltindioxide.

6. The process as claimed in claim 1 wherein the organic solvent used may be isocyanate non reactive and good solvent for the monomers, non-solvent for the polymer particles, which are exemplified by aliphatic hydrocarbons such as hexane, heptane, octane, decane, isooctane, dodecane, hexadecane, superior kerosene, paraffin oil, white mineral oil, molex raffinate and aromatic hydrocarbons such as benzene, toluene, and xylene or a suitable mixture of aliphatic and aromatic hydrocarbons.

7. The process as claimed in claim 1 wherein, the ratio of isocyanate to diol is maintained between 1.05 to 1.5.

8. The process as claimed in claim 1 wherein, the amount of macrodiol varies from 3 to 18 weight percent based on the total quantity of urethane forming reactants.

9. The process as claimed in claim 1 wherein, the amount of catalyst is in the range from 0.005 to 1 weight percent based on the total amount of diol and diisocyanate.

10. The process as claimed in claim 1 wherein, the ratio of monomer to organic continuous phase is between 10 and 30.

11. The process as claimed in claim 1 wherein, the agitator speed may be in between 200 and 800 revolutions per minute (rpm).

12. The process as claimed in claim 1 wherein, the particle size of the polyurethane microsphere ranges from 150 nm to 500μ depending on the concentration of the macrodiol stabilizer.

* * * * *